US012511201B2

(12) United States Patent
Kumar et al.

(10) Patent No.: US 12,511,201 B2
(45) Date of Patent: Dec. 30, 2025

(54) TECHNIQUES FOR PROVIDING DATA BACKUP CONFIGURATIONS AS A SERVICE

(71) Applicant: Rubrik, Inc., Palo Alto, CA (US)

(72) Inventors: Abhishek Kumar, San Jose, CA (US); Scott Wang, Fremont, CA (US); Junchao Zhang, Union City, CA (US); Shaswat Chaubey, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 127 days.

(21) Appl. No.: 17/991,624

(22) Filed: Nov. 21, 2022

(65) Prior Publication Data
US 2024/0168853 A1    May 23, 2024

(51) Int. Cl.
*G06F 11/14*    (2006.01)
*G06F 11/20*    (2006.01)

(52) U.S. Cl.
CPC ...... *G06F 11/1464* (2013.01); *G06F 11/1469* (2013.01); *G06F 11/2025* (2013.01); *G06F 2201/84* (2013.01)

(58) Field of Classification Search
CPC ............. G06F 11/1464; G06F 11/1469; G06F 11/2025; G06F 2201/84
See application file for complete search history.

(56) References Cited

U.S. PATENT DOCUMENTS

| | | | | |
|---|---|---|---|---|
| 9,652,178 | B2* | 5/2017 | Mohl | G06F 3/0619 |
| 2009/0328030 | A1* | 12/2009 | Fries | G06F 8/63 |
| | | | | 717/174 |
| 2020/0341864 | A1* | 10/2020 | Agrawal | G06F 11/1461 |

OTHER PUBLICATIONS

Yang et al., SnapMig: Accelerating VM Live Storage Migration by Leveraging the Existing VM Snapshots in the Cloud, 2018, IEEE, pp. 1416-1427 (Year: 2018).*
Graupner et al., Massive Deployment of Management Agents in Virtual Data Centers, 2001, Hewlett-Packard Company, 29 pages (Year: 2001).*

* cited by examiner

*Primary Examiner* — Gary W. Cygiel
(74) *Attorney, Agent, or Firm* — Holland & Hart LLP

(57) ABSTRACT

A data management system may deploy a virtual machine agent on a source data storage environment including a first set of computing resources managed by a user of a data management platform. In some examples, the virtual machine agent facilitates a connection between the source data storage environment and a target data storage environment including a second set of computing resources managed by the data management platform. The target data storage environment may be configured to automatically recover and restore data at the target data storage environment based on determining a failover event at the source data storage environment. The data management system may receive, from the user, a backup configuration configuring a schedule for backing up the data from the source data storage environment to the target data storage environment. The data management system may then perform a backup of the data in accordance with the backup configuration.

20 Claims, 10 Drawing Sheets

US 12,511,201 B2

TECHNIQUES FOR PROVIDING DATA BACKUP CONFIGURATIONS AS A SERVICE

FIELD OF TECHNOLOGY

The present disclosure relates generally to database systems and data processing, and more specifically to techniques for providing data backup configurations as a service.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
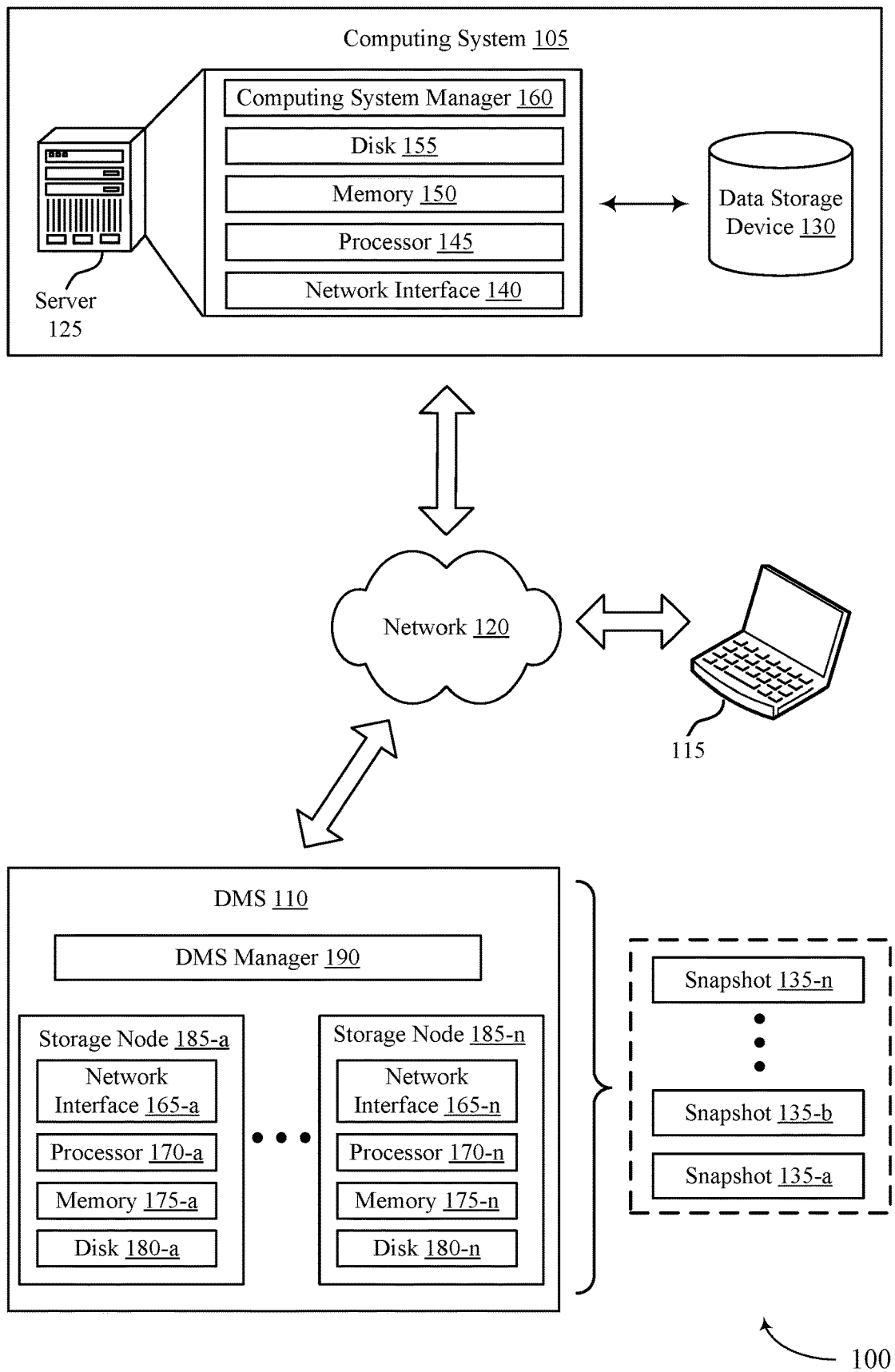
FIG. 1 illustrates an example of a method for data management system that supports techniques for providing data backup configurations as a service in accordance with aspects of the present disclosure.

Some cloud data storage services may support multi-node clustered storage architecture. In some examples, a large number of production databases may run on multi-node clustered architectures, where the database may have instances running across multiple nodes of a cluster. In particular, clustered databases may allow customers to run a single database across multiple servers (e.g., nodes) in order to maximize availability and enable horizontal scalability, while accessing shared storage. The production databases may also support jobs to backup databases. In some examples, a scheduler may schedule backup jobs on such nodes. A user of a data management and backup system may create backups of one or more machines (e.g., virtual machines, cloud machines, data centers, etc.). To initiate a backup, the user may select a backup configuration at the data management and backup system. Additionally, the user may select a target environment (e.g., target set of virtual machines or cloud machines) for the data management and backup system to store the backup. However, configuring a target environment for backup can consume a large amount of resources. Additionally, a user may not have access to or may not be willing to use resources (e.g., money, engineering resources) to purchase or manage a target environment (e.g., a secondary data center) to be used for disaster recovery or other backup and restoration purposes.

One or more aspects of the present disclosure describe techniques for deploying an agent (e.g., a virtual machine agent) on a source environment (e.g., computing devices, virtual machines, cloud machines, data centers, etc.). The techniques depicted herein provide for utilizing backup configuration as a service. Particularly, users who don't own (e.g., manage, pay for, maintain, etc.) resources for a target environment may use the techniques depicted herein to perform backup of a source environment. Such a backup is stored at cloud resources owned by (e.g., managed, paid for, maintained, etc.) the data management and backup system. The virtual machine agent, when deployed to the set of virtual machines, may communicate with the data management and backup system. For instance, the virtual machine agent may facilitate the data management and backup system to capture and process snapshots of the source environment. Additionally, the user may set up a backup configuration for the data management and backup system to capture snapshots. The data management and backup system may capture and store the snapshots in resources (e.g., cloud resources) owned by the data management and backup system. In this way, the user may utilize backup services provided by the data management and backup system, but may not have to perform one or more tasks associated with the management or configuration of the backup process.

Aspects of the disclosure are initially described in the context of an environment supporting an on-demand database service. Aspects of the disclosure are further described in the context of computing systems and process flow. Aspects of the disclosure are further illustrated by and described with reference to apparatus diagrams, system diagrams, and flowcharts that relate to techniques for providing data backup configurations as a service.

FIG. 1 illustrates an example of a computing environment 100 for cloud computing that supports techniques for using data backup and disaster recovery configurations for application management in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150) and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190) may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

According to one or more aspects depicted herein, the DMS 110 may deploy a virtual machine agent on a source data storage environment including a first set of computing resources managed by a user of a data management platform. In some examples, the virtual machine agent may facilitate a connection between the source data storage environment including the first set of computing resources managed by the user and a target data storage environment including a second set of computing resources managed by the data management platform. In some examples, the target data storage environment may be configured to automatically recover and restore data at the target data storage environment based on determining a failover event at the source data storage environment. The DMS 110 may receive, from the user of the data management platform, a backup configuration configuring a schedule for backing up the data from the source data storage environment to the target data storage environment. In some examples, the DMS 110 may perform a backup of the data from the source data storage environment to the target data storage environment in accordance with the backup configuration.

It should be appreciated by a person skilled in the art that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
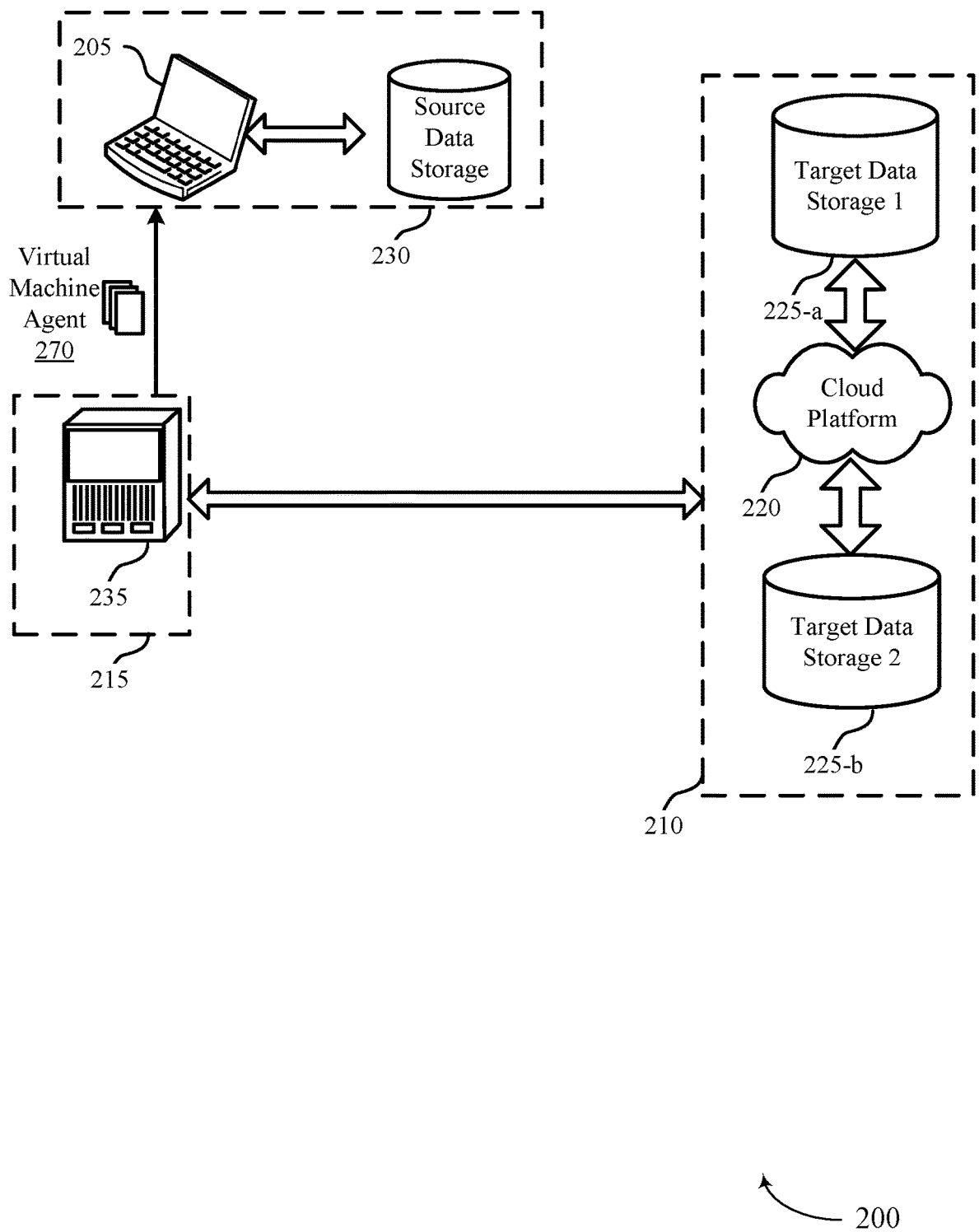
FIG. 2 illustrates an example of a computing system that supports techniques for providing data backup configurations as a service in accordance with aspects of the present disclosure.

FIG. 2 illustrates an example of a computing system 200 that supports techniques for providing data backup configurations as a service in accordance with aspects of the present disclosure. The computing system 200 includes a user device 205, a source data storage environment 230, a data management platform 210 and a data manager 215. The data management platform 210 may be a data storage infrastructure. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The data management platform 210 may include a first target data storage 225-a (e.g., first storage node) and a second target data storage 225-b (e.g., second storage node). Although not depicted herein, the data management platform 210 may include more than two target data storage environments 225. The target data storage environments 225 may be geographically separated from each other. As depicted in the example of FIG. 2, the data management platform 210 may include a cloud platform 220. The cloud platform 220 may offer an on-demand storage and computing services to the user device 205. In some cases, the data management platform 210 may be an example of a storage system with built-in data management. The data management platform 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 may support a large number of production databases running on clustered setups. In some examples, such databases may have instances running across multiple nodes of a cluster (e.g., data management platform 210 including a computing cluster). The computing system 200 may leverage the high availability and horizontal scalability of cluster configurations to distribute backup load evenly across the nodes in the data management platform 210. Aspects depicted herein provide for using a data backup configuration to perform a backup of data from the source data storage environment 230 to a target data storage environment (e.g., data management platform 210 including the first target data storage 225-a and the second target data storage 225-b. In some examples, the source data storage environment 230 may include a set of resources that is owned by a user. Additionally, the target data storage environment may include a set of resources that is owned by the data manager 215.

A first target data storage 225-a may support a first data management platform and a second target data storage 225-b may support a second data management platform. To effectively support enhanced backup configuration, the computing system 200 may support performing backup of data (e.g., data from the source data storage) within the data management platform 210 that includes the first target data storage 225-a (data storage node 1) and a second target data storage 225-b (data storage node 2) that is geographically separated from the first target data storage 225-a.

In some examples, customers own resources for storage of their data. However, customers may not own or be willing to invest in resources for backup of their data. In some examples, customers may not have a backup service (e.g., backup provided by a data management platform) to protect their virtual machines. Some customers may not have a secondary data center to back up their primary data center but may still be willing to protect their applications. Additionally or alternatively, the customers may not be willing to spend resources (storage and compute) for disaster recovery use cases. However, they may be willing to protect their applications against any such threats. In some cases, customers may be willing to use orchestration functionality provided by the computing system 200. For instance, the data management platform 210 in conjunction with the data manager 215 may perform a backup of the data via an application. Thus, the customers may have their data (e.g., data from applications) protected without owning or using their own storage and computing resources.

The computing system 200 may support a virtual machine agent 270, which when deployed on a source data storage environment facilitates a backup operation for backing up data from the source data storage environment 230 to the target data storage environment (include in the data management platform 210). The data manager 215 may receive a request for the data manager 215 to perform a backup operation using resources owned or otherwise configured by the data manager 215. Upon receiving the request, the data manager 215 may deploy the virtual machine agent 270) on the source data storage environment 230. The source data storage environment 230 may include a first set of computing resources managed by a user of the data management platform 210. The virtual machine agent 270 may facilitate a connection between the source data storage environment 230 including the first set of computing resources managed by the user and a target data storage environment 225 including a second set of computing resources managed by the data management platform. The target data storage environment 225 may be configured to automatically recover and restore data at the target data storage environment based on determining a failover event at the source data storage environment 230. That is, the data manager 215 may determine that there is a failover event at the source data storage environment 230, and the data manager 215 may facilitate automatic recovery and restoration of the data upon determining the failover. In some instances, the data manager 215 may identify a location of a storage device where the backup is restored, and may provide an identifier for the storage location (e.g., Internet Protocol (IP) address) to the user.

The virtual machine agent 270) may run in a customer's virtual machine environment (e.g., source data storage environment 230). The virtual machine agent 270 may be able to communicate to the data management platform 210. In some examples, the virtual machine agent 270) may have a cloud platform connected to archive the snapshots in the cloud. Once the virtual machine agent 270 communicates to the user interface associated with the data manager 215, the users (e.g., customers) may be able to see all the virtual machines they have in their source data storage environment 230. In some examples, the customer may select one or more virtual machines that they want to protect and may assign a service level agreement for the selected virtual machines. Upon identifying the service level agreement, the data manager 215 may capture a snapshot for the selected virtual machine and may move the snapshot to the data management platform 210. Additionally or alternatively, the data manager 215 may archive the snapshots locally once they are archived to the data management platform 210. After that, the virtual machine agent 270 may start capturing snapshots and archive the snapshots to the data management platform 210. In some examples, users can may these snapshots on the data management platform 210 to recover their applications in the data management platform 210. In some examples, the data manager 215 may receive, from the user of the data management platform 210, a backup configuration configuring a schedule for backing up the data from the source data storage environment 230 to the target data storage environment 225. The data manager 215 may then perform a backup of the data from the source data storage environment 230 to the target data storage environment 225 in accordance with the backup configuration.

For customers not using the data management platform 210 for data protection, the techniques depicted herein may provide for installation of an agent (a VM—Edge) in their source data storage environment 230. Once the agent is installed and running, the virtual machine agent 270 may have a pre-loaded configuration to connect to the data management platform 210. Once deployed, the virtual machine agent 270 may receive information about all the virtual machines included in the source data storage environment 230. The customers may be able to see and access all the virtual machines in the source data storage environment 230 to create an application for performing backup from the source data storage environment 230 to the target data storage environment 225.

In some examples, the data manager 215 may assign specific IP addresses to the customer, which they can use for their recovered application. In the backup configuration, the customer may indicate the virtual machines (or other data) for backing up via a backup configuration. Once the data manager 215 receives an indication of the data that the customer wants to protect under an application. The data manager 215 may then assign service level agreement to these virtual machines. In some examples, the service level agreement may archive the snapshots to the data management platform 210. The customer may select retention and time to take a snapshot, along with the metadata including configuration files, CPU, memory, network information, that the data management platform 210 may recover. Once the customer has completed the service level agreement assignment, the virtual machine agent 270 may archive the snapshots locally after putting them into the data management platform 210.

In some examples, the data manager 215 may determine the failover event at the source data storage environment 230. The data manager 215 may then restore the data at a storage location associated with the target data storage environment 225 in accordance with the backup configuration and based on determining the failover event at the source data storage environment 230. In some examples, the data manager 215 may display an identifier associated with the storage location upon completion of restoration of the data at the storage location. For instance, the data manager 215 may display an IP address associated with a storage node at the target data storage environment 225.

Upon identifying a failover event, if users want to recover the application, they may access the data management platform 210 and recover using any snapshots they choose. For example, the data manager 215 may receive, from the user of the data management platform, a selection of a snapshot to use when performing the backup of the data from the source data storage environment 230 to the target data storage environment 225. Once the customers are done identifying the snapshot, the customers may further select cleanup, bringing down the virtual machines and moving back to old mode. In some examples, the data manager 215 may determine that the user of the data management platform has completed a service level agreement. In some cases, performing the backup of the data from the source data storage environment 230 to the target data storage environment 225 may be based on the determining. Upon restoring the data, the data manager may have the customer's application up and running in a cloud platform. If the customer's data center is fixed and ready to bring their application back, they can fail back the application. In such cases, the data manager 215 may determine that the source data storage environment has been restored after the failover event and may discontinue restoring of the data at the target data storage environment based on the determining.

Thus, the techniques depicted herein provide an option for customers to use the backup configuration for disaster recovery. Additionally, using the techniques depicted herein, customer may not need to assign a dedicated target location to perform disaster recovery. The data manager 215 may automatically recover and restore the customer's data to the data management platform 210 based on the snapshots archived on the data management platform 210. In some examples, instead of relying on replication to do failover, the techniques depicted herein may leverage archived snapshots to automatically recover and restore data in case of a failover. In addition, the techniques may be beneficial to the customers who may have their applications protected from threat without having to own or maintain any backup infrastructure.

Figure 3:
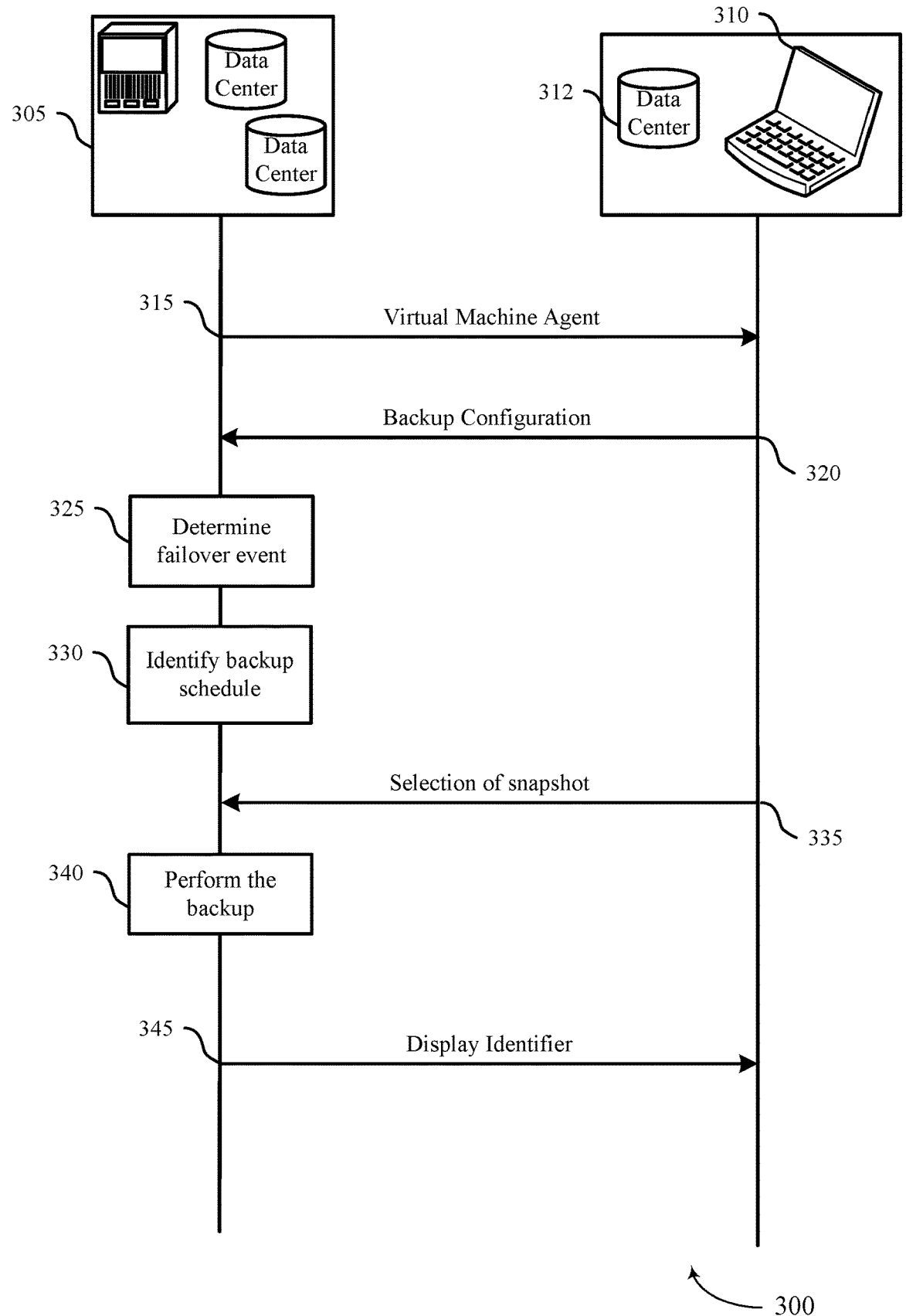
FIG. 3 illustrates an example of a process flow that supports techniques for providing data backup configurations as a service in accordance with aspects of the present disclosure.

FIG. 3 illustrates an example of a process flow 300 that supports techniques for providing data backup configurations as a service in accordance with aspects of the present disclosure. The process flow 300 includes a data management platform 305 including a target data storage environment and a user device 310 including a source data storage environment 312. The data management platform 305 may include an application server, a metadata storage and multiple data centers of a computing cluster as described with respect to FIGS. 2 and 3. The source data storage environment 312 may include a first set of computing resources managed by a user of a data management platform 305. The data management platform 305 may include a target data storage environment including a second set of computing resources managed by the data management platform 305. The user device 310 may be an example of a user device as described with respect to FIGS. 2 and 3. Although a single entity is depicted as data management platform 305, it may be understood that components of the data management platform 305 may be located in different locations.

In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 315, the data management platform 305 may deploy a virtual machine agent on the source data storage environment 312 including a first set of computing resources managed by a user of a data management platform. In some examples, the virtual machine agent facilitates a connection between the source data storage environment 312 including the first set of computing resources managed by the user and a target data storage environment including a second set of computing resources managed by the data management platform 305. In some examples, the virtual machine agent may include a software code deployed on the source data storage environment to archive one or more snapshots of the source data storage environment in the target data storage environment.

In some examples, the target data storage environment may be configured to automatically recover and restore data at the target data storage environment based on determining a failover event at the source data storage environment 312. the data management platform 305 may configure the second set of computing resources included in the target data storage environment. In some examples, the data management platform may manage the second set of computing resources included in the target data storage environment according to a software as a service configuration for the user of the data management platform.

At 320, the data management platform 305 may receive, from the user of the data management platform, a backup configuration configuring a schedule for backing up the data from the source data storage environment 312 to the target data storage environment. At 325, the data management platform 305 may determine the failover event at the source data storage environment 312.

At 330, the data management platform 305 may identify, in accordance with the backup configuration, at least one of the schedule for backing up the data from the source data storage environment 312 to the target data storage environment, a time for capturing a snapshot, metadata associated with configuration files, memory information, network information, or a combination thereof. In some examples, restoring the data at the storage location may be based on the identifying.

At 335, the data management platform 305 may receive, from the user of the data management platform, a selection of a snapshot to use when performing the backup of the data from the source data storage environment 312 to the target data storage environment.

At 340, the data management platform 305 may perform a backup of the data from the source data storage environment to the target data storage environment in accordance with the backup configuration. In some examples, the data management platform 305 may restore the data at a storage location associated with the target data storage environment in accordance with the backup configuration and based on determining the failover event at the source data storage environment 312. The data management platform 305 may display an identifier associated with the storage location upon completion of restoration of the data at the storage location.

Figure 4:
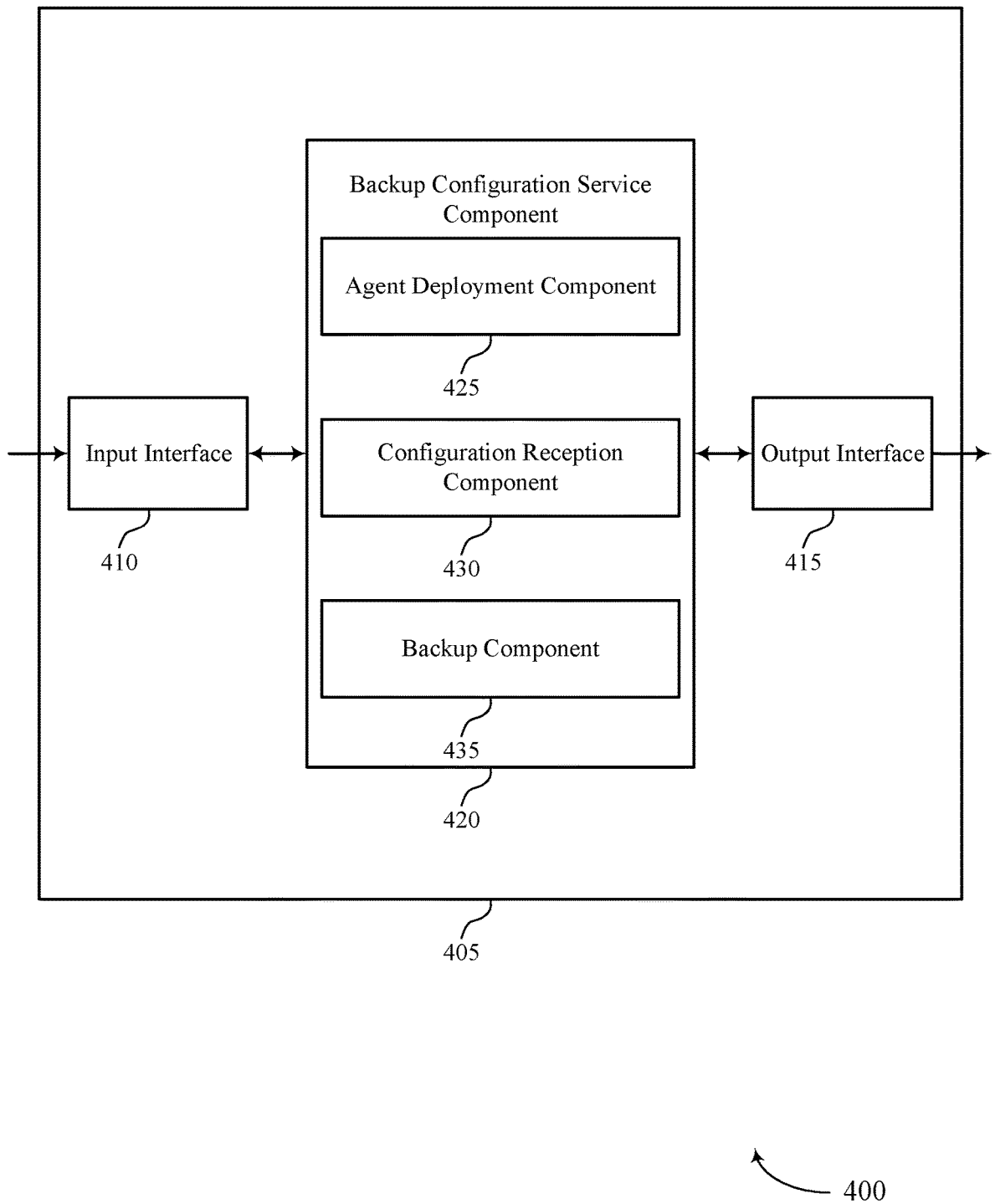
FIG. 4 illustrates a block diagram of a system that supports techniques for providing data backup configurations as a service in accordance with aspects of the present disclosure.

FIG. 4 illustrates a block diagram 400 of a system 405 that supports techniques for providing data backup configurations as a service in accordance with aspects of the present disclosure. The system 405 may be an example of aspects of one or more components described with reference to FIG. 1, such as a DMS 110. The system 405 may include an input interface 410, an output interface 415, and a backup configuration service component 420. The system 405 may also include one or more processors. Each of these components may be in communication with one another (e.g., via one or more buses, communications links, communications interfaces, or any combination thereof.

The input interface 410 may manage input signals for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the backup configuration service component 420 to support data backup configurations as a service. In some cases, the input interface 410 may be a component of a network interface 610 as described with reference to FIG. 6.

The output interface 415 may manage output signals for the system 405. For example, the output interface 415 may receive signals from other components of the system 405, such as the backup configuration service component 420, and may transmit such output signaling corresponding to (e.g., representative of or otherwise based on) such signaling to other systems or devices. In some cases, the output interface 415 may be a component of a network interface 610 as described with reference to FIG. 6.

For example, the backup configuration service component 420 may include an agent deployment component 425, a configuration reception component 430, a backup component 435, or any combination thereof. In some examples, the backup configuration service component 420, or various components thereof, may be configured to perform various operations (e.g., receiving, monitoring, transmitting) using or otherwise in cooperation with the input interface 410, the output interface 415, or both. For example, the backup configuration service component 420 may receive information from the input interface 410, send information to the output interface 415, or be integrated in combination with the input interface 410, the output interface 415, or both to receive information, transmit information, or perform various other operations as described herein.

The backup configuration service component 420 may support data management in accordance with examples as disclosed herein. The agent deployment component 425 may be configured as or otherwise support a means for deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment. The configuration reception component 430 may be configured as or otherwise support a means for receiving, from the user of the data management platform, a backup configuration configuring a schedule for backing up the data from the source data storage environment to the target data storage environment. The backup component 435 may be configured as or otherwise support a means for performing a backup of the data from the source data storage environment to the target data storage environment in accordance with the backup configuration.

Figure 5:
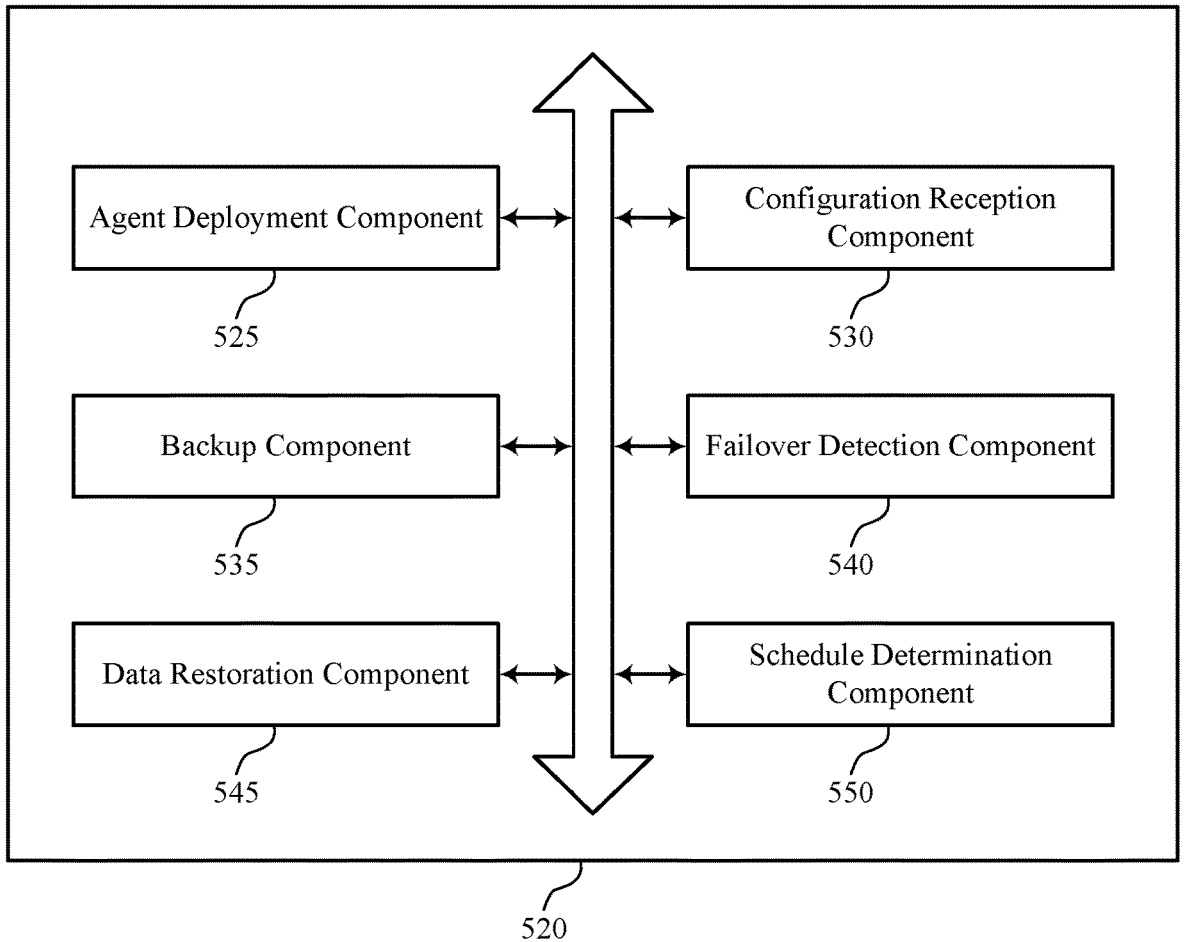
FIG. 5 illustrates a block diagram of a backup configuration service component that supports techniques for providing data backup configurations as a service in accordance with aspects of the present disclosure.

FIG. 5 illustrates a block diagram 500 of a backup configuration service component 520 that supports techniques for providing data backup configurations as a service in accordance with aspects of the present disclosure. The backup configuration service component 520 may be an example of aspects of a backup configuration service component 420, or both, as described herein. The backup configuration service component 520, or various components thereof, may be an example of means for performing various aspects of techniques for providing data backup configurations as a service as described herein. For example, the backup configuration service component 520 may include an agent deployment component 525, a configuration reception component 530, a backup component 535, a failover detection component 540, a data restoration component 545, a schedule determination component 550, or any combination thereof. Each of these components may communicate, directly or indirectly, with one another (e.g., via one or more buses).

The backup configuration service component 520 may support data management in accordance with examples as disclosed herein. The agent deployment component 525 may be configured as or otherwise support a means for deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment. The configuration reception component 530 may be configured as or otherwise support a means for receiving, from the user of the data management platform, a backup configuration configuring a schedule for backing up the data from the source data storage environment to the target data storage environment. The backup component 535 may be configured as or otherwise support a means for performing a backup of the data from the source data storage environment to the target data storage environment in accordance with the backup configuration.

In some examples, the failover detection component 540 may be configured as or otherwise support a means for determining the failover event at the source data storage environment. In some examples, the data restoration component 545 may be configured as or otherwise support a means for restoring the data at a storage location associated with the target data storage environment in accordance with the backup configuration and based on determining the failover event at the source data storage environment.

In some examples, the data restoration component 545 may be configured as or otherwise support a means for displaying an identifier associated with the storage location upon completion of restoration of the data at the storage location.

In some examples, the data restoration component 545 may be configured as or otherwise support a means for receiving, from the user of the data management platform, a selection of a snapshot to use when performing the backup of the data from the source data storage environment to the target data storage environment.

In some examples, the schedule determination component 550 may be configured as or otherwise support a means for identifying, in accordance with the backup configuration, at least one of the schedule for backing up the data from the source data storage environment to the target data storage environment, a time for capturing a snapshot, metadata associated with configuration files, memory information, network information, or a combination thereof, where restoring the data at the storage location is based on the identifying.

In some examples, the backup component 535 may be configured as or otherwise support a means for determining that the user of the data management platform has completed a service level agreement, where performing the backup of the data from the source data storage environment to the target data storage environment is based on the determining.

In some examples, the backup component 535 may be configured as or otherwise support a means for determining that the source data storage environment has been restored after the failover event. In some examples, the backup component 535 may be configured as or otherwise support a means for discontinuing restoring of the data at the target data storage environment based on the determining. In some examples, the data management platform configures the second set of computing resources included in the target data storage environment.

In some examples, the data management platform manages the second set of computing resources included in the target data storage environment according to a software as a service configuration for the user of the data management platform. In some examples, the virtual machine agent includes a software code deployed on the source data storage environment to archive one or more snapshots of the source data storage environment in the target data storage environment.

Figure 6:
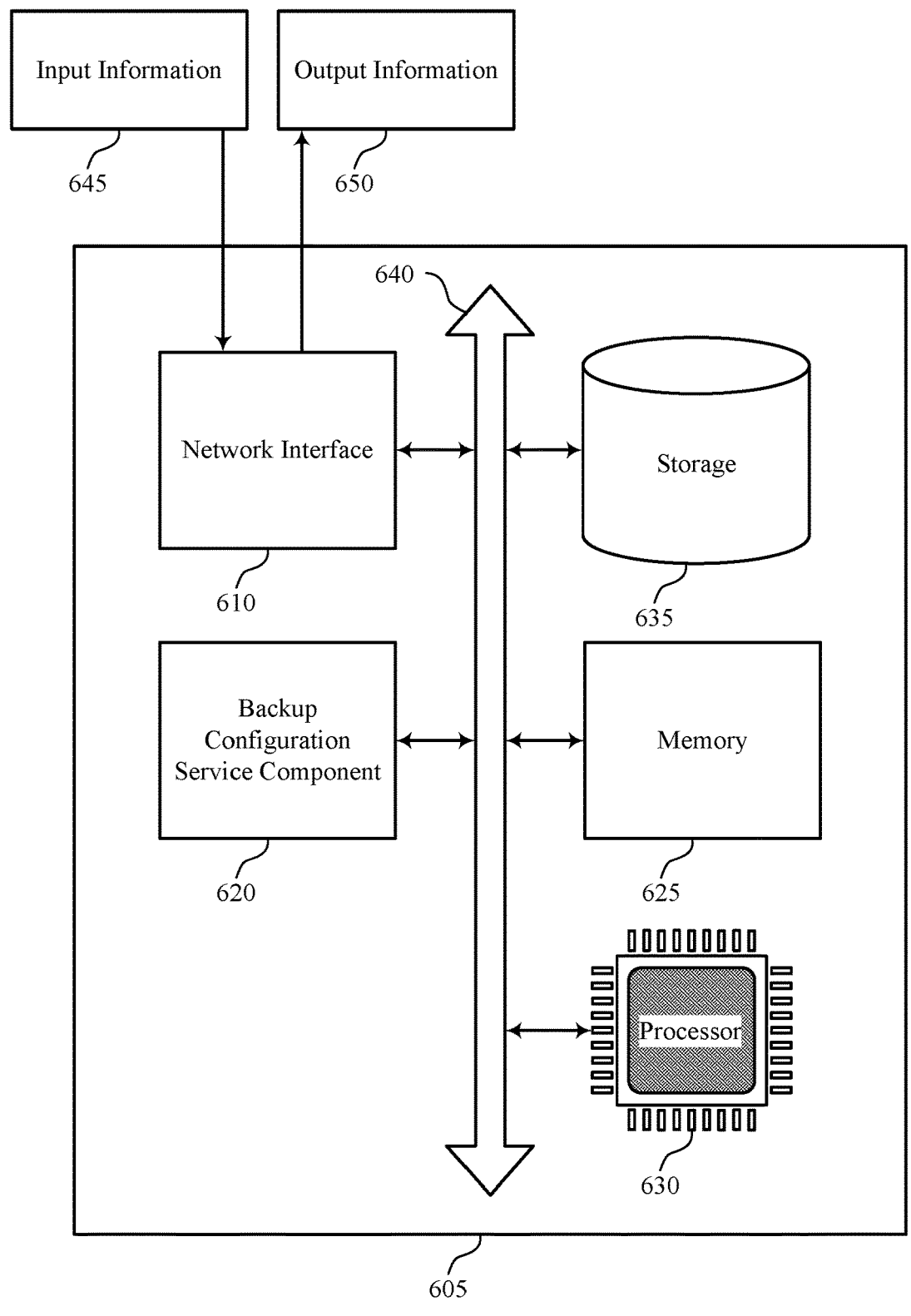
FIG. 6 illustrates a diagram of a system including a device that supports techniques for providing data backup configurations as a service in accordance with aspects of the present disclosure.

FIG. 6 illustrates a diagram of a system 600 including a device 605 that supports techniques for providing data backup configurations as a service in accordance with aspects of the present disclosure. The device 605 may be an example of or include the components of a system 405 as described herein. The device 605 may include components for bi-directional data communications including components for transmitting and receiving communications, such as a backup configuration service component 620, a network interface 610, a memory 625, a processor 630, and a storage 635. These components may be in electronic communication or otherwise coupled (e.g., operatively, communicatively, functionally, electronically, electrically) via one or more buses (e.g., a bus 640).

The network interface 610 may manage input information 645 and output information 650 for the device 605. The network interface 610 may also manage peripherals not integrated into the device 605. In some cases, the network interface 610 may represent a physical connection or port to an external peripheral. In some cases, the network interface 610 may utilize an operating system such as iOSR, ANDROIDR, MS-DOSR, MS-WINDOWS®, OS/2R, UNIXR, LINUXR, or another known operating system. In other cases, the network interface 610 may represent or interact with a modem, a keyboard, a mouse, a touchscreen, or a similar device. In some cases, the network interface 610 may be implemented as part of a processor 630. In some examples, a user may interact with the device 605 via the network interface 610 or via hardware components controlled by the network interface 610. The storage 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting techniques for providing data backup configurations as a service).

The backup configuration service component 620 may support data management in accordance with examples as disclosed herein. For example, the backup configuration service component 620 may be configured as or otherwise support a means for deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment. The backup configuration service component 620 may be configured as or otherwise support a means for receiving, from the user of the data management platform, a backup configuration configuring a schedule for backing up the data from the source data storage environment to the target data storage environment. The backup configuration service component 620 may be configured as or otherwise support a means for performing a backup of the data from the source data storage environment to the target data storage environment in accordance with the backup configuration.

By including or configuring the backup configuration service component 620 in accordance with examples as described herein, the device 605 may support techniques for enhanced backup solution for backing up a source data storage to a target data storage.

Figure 7:
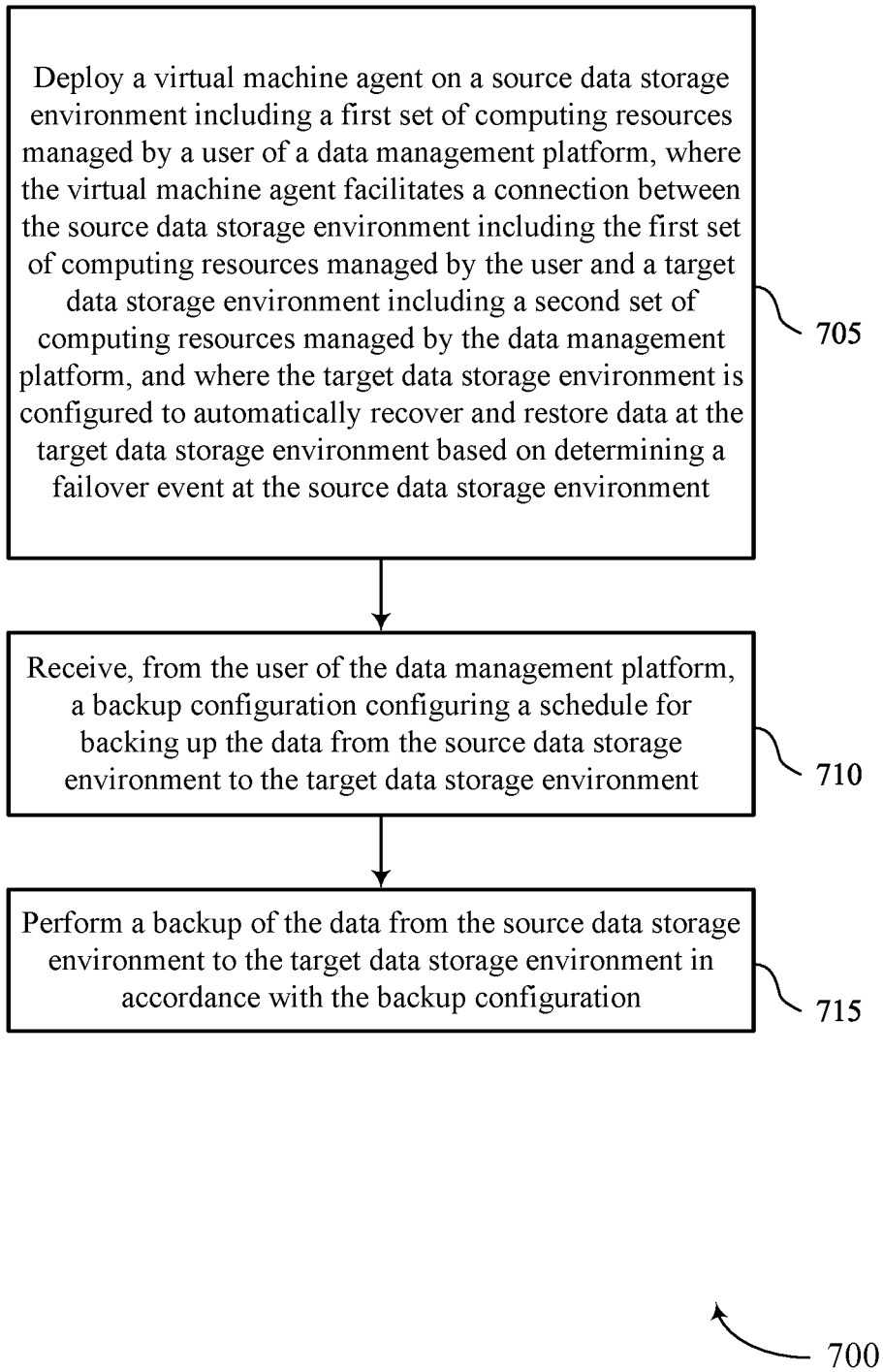
FIGS. 7 through 10 illustrate flowcharts showing methods that support techniques for providing data backup configurations as a service in accordance with aspects of the present disclosure.

FIG. 7 illustrates a flowchart showing a method 700 that supports techniques for providing data backup configurations as a service in accordance with aspects of the present disclosure. The operations of the method 700 may be implemented by a data manager or its components as described herein. For example, the operations of the method 700 may be performed by a data manager as described with reference to FIGS. 1 through 6. In some examples, a data manager may execute a set of instructions to control the functional elements of the data manager to perform the described functions. Additionally, or alternatively, the data manager may perform aspects of the described functions using special-purpose hardware.

At 705, the method may include deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment. The operations of 705 may be performed in accordance with examples as disclosed herein. In some examples, aspects of the operations of 705 may be performed by an agent deployment component 525 as described with reference to FIG. 5.

At 710, the method may include receiving, from the user of the data management platform, a backup configuration configuring a schedule for backing up the data from the source data storage environment to the target data storage environment. The operations of 710 may be performed in accordance with examples as disclosed herein. In some examples, aspects of the operations of 710 may be performed by a configuration reception component 530 as described with reference to FIG. 5.

At 715, the method may include performing a backup of the data from the source data storage environment to the target data storage environment in accordance with the backup configuration. The operations of 715 may be performed in accordance with examples as disclosed herein. In some examples, aspects of the operations of 715 may be performed by a backup component 535 as described with reference to FIG. 5.

Figure 8:
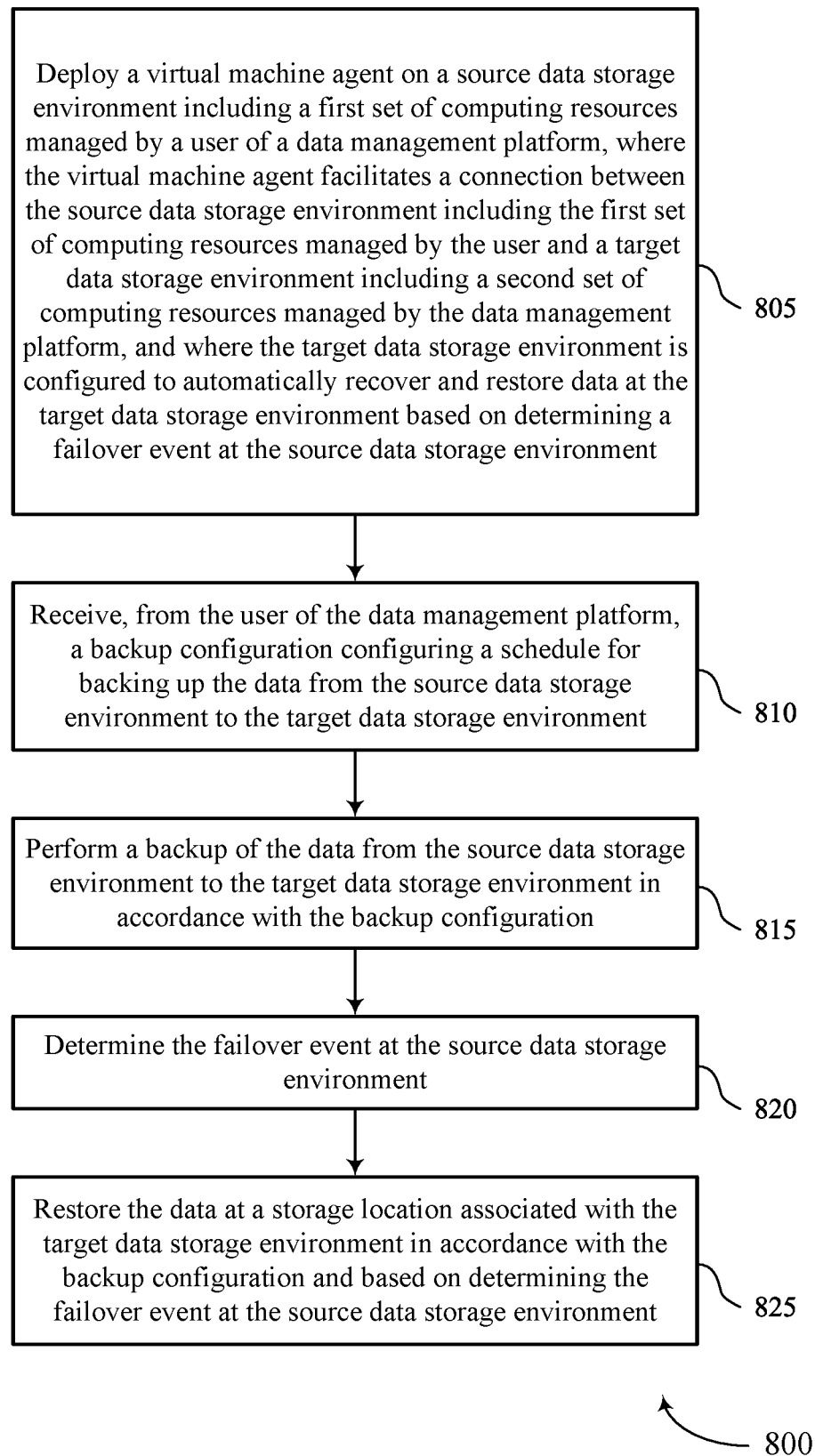

FIG. 8 illustrates a flowchart showing a method 800 that supports techniques for providing data backup configurations as a service in accordance with aspects of the present disclosure. The operations of the method 800 may be implemented by a data manager or its components as described herein. For example, the operations of the method 800 may be performed by a data manager as described with reference to FIGS. 1 through 6. In some examples, a data manager may execute a set of instructions to control the functional elements of the data manager to perform the described functions. Additionally, or alternatively, the data manager may perform aspects of the described functions using special-purpose hardware.

At 805, the method may include deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment. The operations of 805 may be performed in accordance with examples as disclosed herein. In some examples, aspects of the operations of 805 may be performed by an agent deployment component 525 as described with reference to FIG. 5.

At 810, the method may include receiving, from the user of the data management platform, a backup configuration configuring a schedule for backing up the data from the source data storage environment to the target data storage environment. The operations of 810 may be performed in accordance with examples as disclosed herein. In some examples, aspects of the operations of 810 may be performed by a configuration reception component 530 as described with reference to FIG. 5.

At 815, the method may include performing a backup of the data from the source data storage environment to the target data storage environment in accordance with the backup configuration. The operations of 815 may be performed in accordance with examples as disclosed herein. In some examples, aspects of the operations of 815 may be performed by a backup component 535 as described with reference to FIG. 5.

At 820, the method may include determining the failover event at the source data storage environment. The operations of 820 may be performed in accordance with examples as disclosed herein. In some examples, aspects of the operations of 820 may be performed by a failover detection component 540 as described with reference to FIG. 5.

At 825, the method may include restoring the data at a storage location associated with the target data storage environment in accordance with the backup configuration and based on determining the failover event at the source data storage environment. The operations of 825 may be performed in accordance with examples as disclosed herein. In some examples, aspects of the operations of 825 may be performed by a data restoration component 545 as described with reference to FIG. 5.

Figure 9:
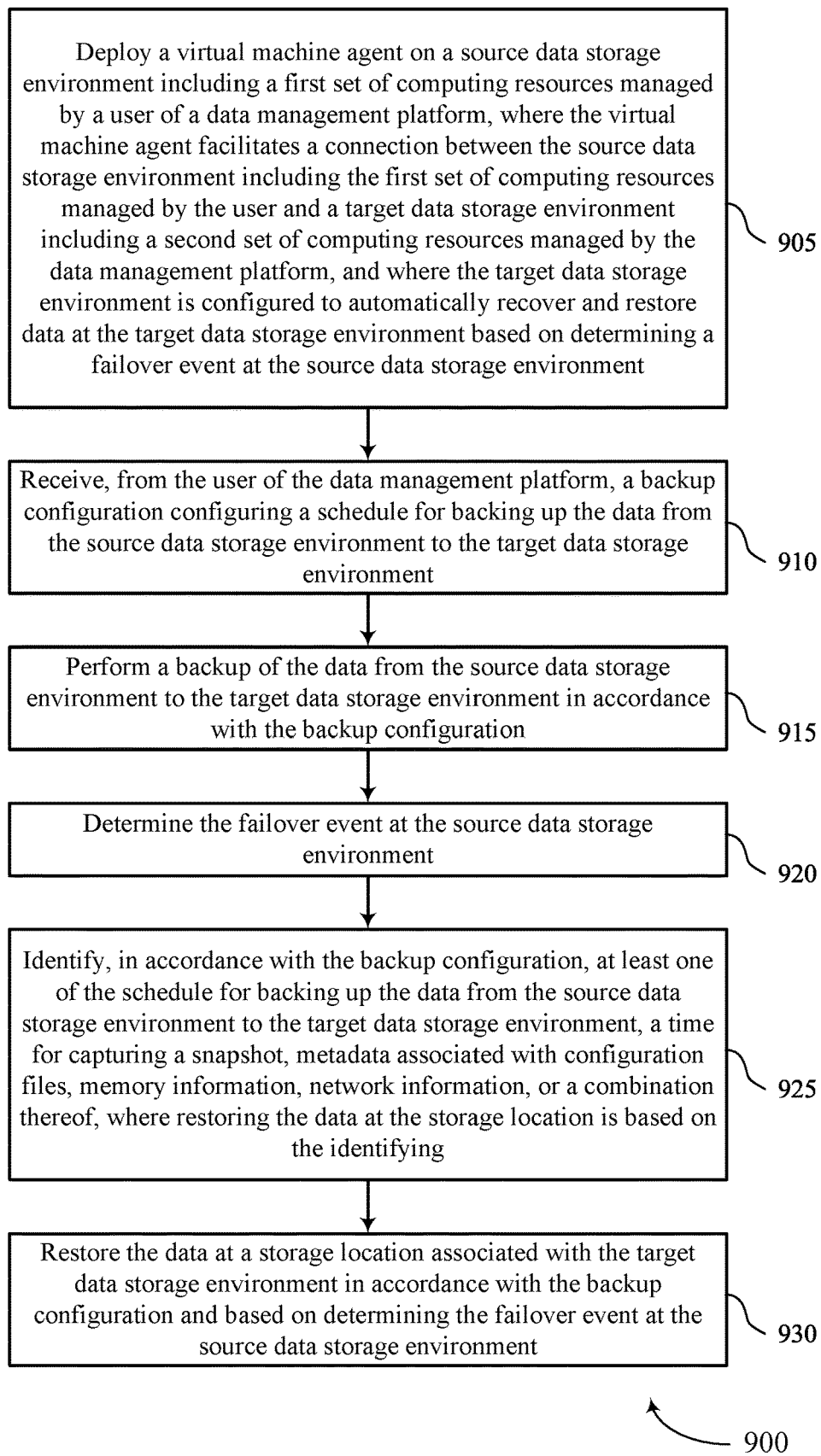

FIG. 9 illustrates a flowchart showing a method 900 that supports techniques for providing data backup configurations as a service in accordance with aspects of the present disclosure. The operations of the method 900 may be implemented by a data manager or its components as described herein. For example, the operations of the method 900 may be performed by a data manager as described with reference to FIGS. 1 through 6. In some examples, a data manager may execute a set of instructions to control the functional elements of the data manager to perform the described functions. Additionally, or alternatively, the data manager may perform aspects of the described functions using special-purpose hardware.

At 905, the method may include deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment. The operations of 905 may be performed in accordance with examples as disclosed herein. In some examples, aspects of the operations of 905 may be performed by an agent deployment component 525 as described with reference to FIG. 5.

At 910, the method may include receiving, from the user of the data management platform, a backup configuration configuring a schedule for backing up the data from the source data storage environment to the target data storage environment. The operations of 910 may be performed in accordance with examples as disclosed herein. In some examples, aspects of the operations of 910 may be performed by a configuration reception component 530 as described with reference to FIG. 5.

At 915, the method may include performing a backup of the data from the source data storage environment to the target data storage environment in accordance with the backup configuration. The operations of 915 may be performed in accordance with examples as disclosed herein. In some examples, aspects of the operations of 915 may be performed by a backup component 535 as described with reference to FIG. 5.

At 920, the method may include determining the failover event at the source data storage environment. The operations of 920 may be performed in accordance with examples as disclosed herein. In some examples, aspects of the operations of 920 may be performed by a failover detection component 540 as described with reference to FIG. 5.

At 925, the method may include identifying, in accordance with the backup configuration, at least one of the schedule for backing up the data from the source data storage environment to the target data storage environment, a time for capturing a snapshot, metadata associated with configuration files, memory information, network information, or a combination thereof, where restoring the data at the storage location is based on the identifying. The operations of 925 may be performed in accordance with examples as disclosed herein. In some examples, aspects of the operations of 925 may be performed by a schedule determination component 550 as described with reference to FIG. 5.

At 930, the method may include restoring the data at a storage location associated with the target data storage environment in accordance with the backup configuration and based on determining the failover event at the source data storage environment. The operations of 930 may be performed in accordance with examples as disclosed herein. In some examples, aspects of the operations of 930 may be performed by a data restoration component 545 as described with reference to FIG. 5.

Figure 10:
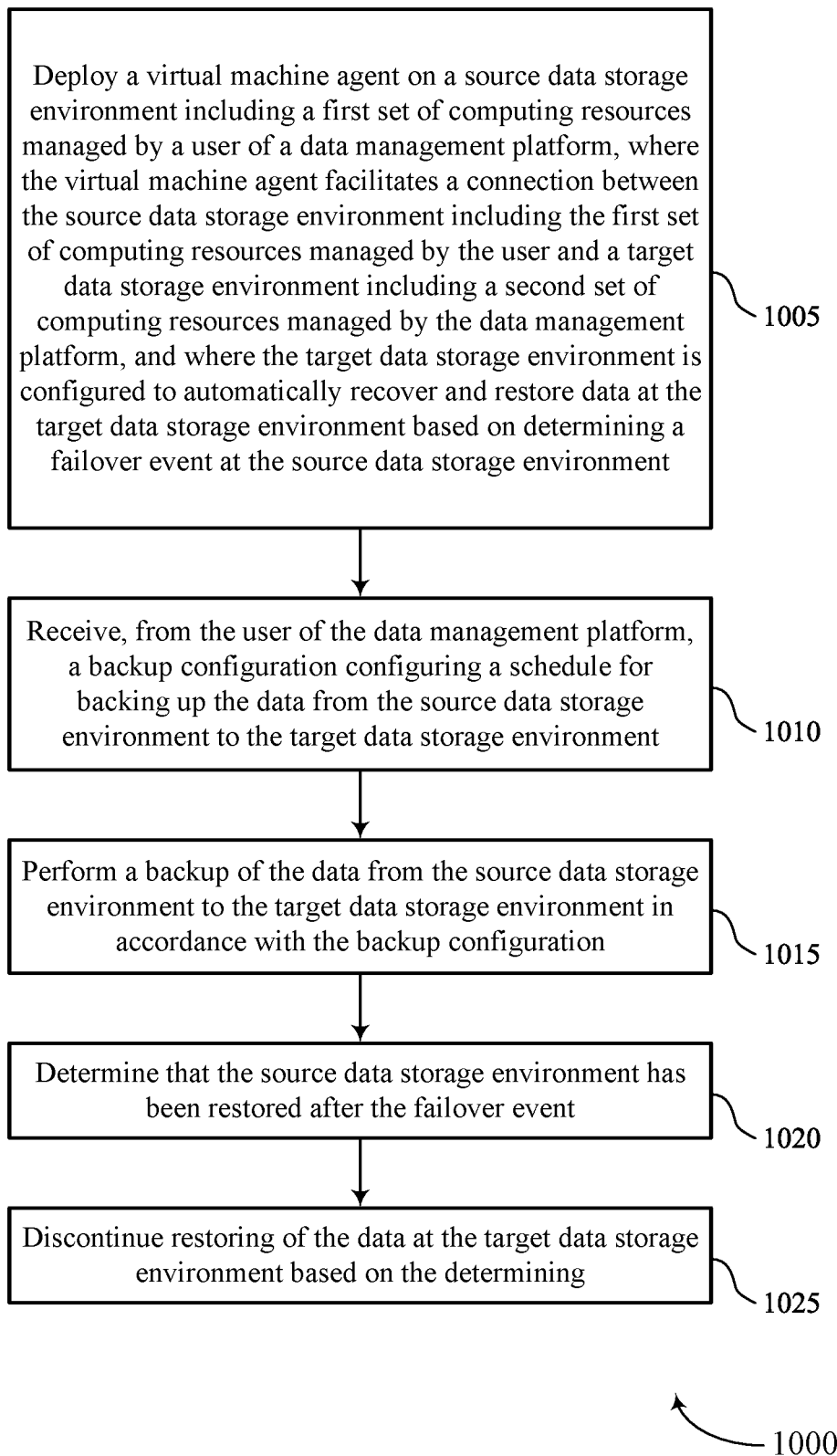

FIG. 10 illustrates a flowchart showing a method 1000 that supports techniques for providing data backup configurations as a service in accordance with aspects of the present disclosure. The operations of the method 1000 may be implemented by a data manager or its components as described herein. For example, the operations of the method 1000 may be performed by a data manager as described with reference to FIGS. 1 through 6. In some examples, a data manager may execute a set of instructions to control the functional elements of the data manager to perform the described functions. Additionally, or alternatively, the data manager may perform aspects of the described functions using special-purpose hardware.

At 1005, the method may include deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment. The operations of 1005 may be performed in accordance with examples as disclosed herein. In some examples, aspects of the operations of 1005 may be performed by an agent deployment component 525 as described with reference to FIG. 5.

At 1010, the method may include receiving, from the user of the data management platform, a backup configuration configuring a schedule for backing up the data from the source data storage environment to the target data storage environment. The operations of 1010 may be performed in accordance with examples as disclosed herein. In some examples, aspects of the operations of 1010 may be performed by a configuration reception component 530 as described with reference to FIG. 5.

At 1015, the method may include performing a backup of the data from the source data storage environment to the target data storage environment in accordance with the backup configuration. The operations of 1015 may be performed in accordance with examples as disclosed herein. In some examples, aspects of the operations of 1015 may be performed by a backup component 535 as described with reference to FIG. 5.

At 1020, the method may include determining that the source data storage environment has been restored after the failover event. The operations of 1020 may be performed in accordance with examples as disclosed herein. In some examples, aspects of the operations of 1020 may be performed by a backup component 535 as described with reference to FIG. 5.

At 1025, the method may include discontinuing restoring of the data at the target data storage environment based on the determining. The operations of 1025 may be performed in accordance with examples as disclosed herein. In some examples, aspects of the operations of 1025 may be performed by a backup component 535 as described with reference to FIG. 5.

A method for data management is described. The method may include deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment, receiving, from the user of the data management platform, a backup configuration configuring a schedule for backing up the data from the source data storage environment to the target data storage environment, and performing a backup of the data from the source data storage environment to the target data storage environment in accordance with the backup configuration.

An apparatus for data management is described. The apparatus may include a processor, memory coupled with the processor, and instructions stored in the memory. The instructions may be executable by the processor to cause the apparatus to deploy a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment, receive, from the user of the data management platform, a backup configuration configuring a schedule for backing up the data from the source data storage environment to the target data storage environment, and perform a backup of the data from the source data storage environment to the target data storage environment in accordance with the backup configuration.

Another apparatus for data management is described. The apparatus may include means for deploying a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment, means for receiving, from the user of the data management platform, a backup configuration configuring a schedule for backing up the data from the source data storage environment to the target data storage environment, and means for performing a backup of the data from the source data storage environment to the target data storage environment in accordance with the backup configuration.

A non-transitory computer-readable medium storing code for data management is described. The code may include instructions executable by a processor to deploy a virtual machine agent on a source data storage environment including a first set of computing resources managed by a user of a data management platform, where the virtual machine agent facilitates a connection between the source data storage environment including the first set of computing resources managed by the user and a target data storage environment including a second set of computing resources managed by the data management platform, and where the target data storage environment is configured to automatically recover and restore data at the target data storage environment based on determining a failover event at the source data storage environment, receive, from the user of the data management platform, a backup configuration configuring a schedule for backing up the data from the source data storage environment to the target data storage environment, and perform a backup of the data from the source data storage environment to the target data storage environment in accordance with the backup configuration.

Some examples of the method, apparatuses, and non-transitory computer-readable medium described herein may further include operations, features, means, or instructions for determining the failover event at the source data storage environment and restoring the data at a storage location associated with the target data storage environment in accordance with the backup configuration and based on determining the failover event at the source data storage environment.

Some examples of the method, apparatuses, and non-transitory computer-readable medium described herein may further include operations, features, means, or instructions for displaying an identifier associated with the storage location upon completion of restoration of the data at the storage location.

Some examples of the method, apparatuses, and non-transitory computer-readable medium described herein may further include operations, features, means, or instructions for receiving, from the user of the data management platform, a selection of a snapshot to use when performing the backup of the data from the source data storage environment to the target data storage environment.

Some examples of the method, apparatuses, and non-transitory computer-readable medium described herein may further include operations, features, means, or instructions for identifying, in accordance with the backup configuration, at least one of the schedule for backing up the data from the source data storage environment to the target data storage environment, a time for capturing a snapshot, metadata associated with configuration files, memory information, network information, or a combination thereof, where restoring the data at the storage location may be based on the identifying.

Some examples of the method, apparatuses, and non-transitory computer-readable medium described herein may further include operations, features, means, or instructions for determining that the user of the data management platform may have completed a service level agreement, where performing the backup of the data from the source data storage environment to the target data storage environment may be based on the determining.

Some examples of the method, apparatuses, and non-transitory computer-readable medium described herein may further include operations, features, means, or instructions for determining that the source data storage environment may have been restored after the failover event and discontinuing restoring of the data at the target data storage environment based on the determining.

In some examples of the method, apparatuses, and non-transitory computer-readable medium described herein, the data management platform configures the second set of computing resources included in the target data storage environment.

In some examples of the method, apparatuses, and non-transitory computer-readable medium described herein, the data management platform manages the second set of computing resources included in the target data storage environment according to a software as a service configuration for the user of the data management platform.

In some examples of the method, apparatuses, and non-transitory computer-readable medium described herein, the virtual machine agent includes a software code deployed on the source data storage environment to archive one or more snapshots of the source data storage environment in the target data storage environment.

The following provides an overview of aspects of the present disclosure:

Aspect 1: A method for data management, comprising: deploying a virtual machine agent on a source data storage environment comprising a first set of computing resources managed by a user of a data management platform, wherein the virtual machine agent facilitates a connection between the source data storage environment comprising the first set of computing resources managed by the user and a target data storage environment comprising a second set of computing resources managed by the data management platform, and wherein the target data storage environment is configured to automatically recover and restore data at the target data storage environment based at least in part on determining a failover event at the source data storage environment: receiving, from the user of the data management platform, a backup configuration configuring a schedule for backing up the data from the source data storage environment to the target data storage environment: and performing a backup of the data from the source data storage environment to the target data storage environment in accordance with the backup configuration.

Aspect 2: The method of aspect 1, further comprising: determining the failover event at the source data storage environment; and restoring the data at a storage location associated with the target data storage environment in accordance with the backup configuration and based at least in part on determining the failover event at the source data storage environment.

Aspect 3: The method of aspect 2, further comprising: displaying an identifier associated with the storage location upon completion of restoration of the data at the storage location.

Aspect 4: The method of any of aspects 2 through 3, further comprising: receiving, from the user of the data management platform, a selection of a snapshot to use when performing the backup of the data from the source data storage environment to the target data storage environment.

Aspect 5: The method of any of aspects 2 through 4, further comprising: identifying, in accordance with the backup configuration, at least one of the schedule for backing up the data from the source data storage environment to the target data storage environment, a time for capturing a snapshot, metadata associated with configuration files, memory information, network information, or a combination thereof, wherein restoring the data at the storage location is based at least in part on the identifying.

Aspect 6: The method of any of aspects 1 through 5, further comprising: determining that the user of the data management platform has completed a service level agreement, wherein performing the backup of the data from the source data storage environment to the target data storage environment is based at least in part on the determining.

Aspect 7: The method of any of aspects 1 through 6, further comprising: determining that the source data storage environment has been restored after the failover event: and discontinuing restoring of the data at the target data storage environment based at least in part on the determining.

Aspect 8: The method of any of aspects 1 through 7, wherein the data management platform configures the second set of computing resources included in the target data storage environment.

Aspect 9: The method of aspect 8, wherein the data management platform manages the second set of computing resources included in the target data storage environment according to a software as a service configuration for the user of the data management platform.

Aspect 10: The method of any of aspects 1 through 9, wherein the virtual machine agent comprises a software code deployed on the source data storage environment to archive one or more snapshots of the source data storage environment in the target data storage environment.

Aspect 11: An apparatus for data management, comprising a processor; memory coupled with the processor; and instructions stored in the memory and executable by the processor to cause the apparatus to perform a method of any of aspects 1 through 10.

Aspect 12: An apparatus for data management, comprising at least one means for performing a method of any of aspects 1 through 10.

Aspect 13: A non-transitory computer-readable medium storing code for data management, the code comprising instructions executable by a processor to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A A method for data management, comprising:
   receiving, at a data management platform, a request to perform a backup service using storage resources associated with the data management platform;
   deploying, in response to receiving the request, a virtual machine agent on a source data storage environment comprising a first set of computing resources managed by a user of the data management platform, wherein the virtual machine agent facilitates the backup service between the source data storage environment and a target data storage environment based at least in part on the virtual machine agent comprising software code operable to execute the backup service, the source data storage environment comprising the first set of computing resources managed by the user and the target data storage environment comprising a second set of computing resources managed by the data management platform, and wherein the virtual machine agent configures the target data storage environment to automatically recover and restore data at the target data storage environment based at least in part on determining a failover event at the source data storage environment;
   receiving, from the user of the data management platform, a backup configuration configuring a schedule for backing up the data from the source data storage environment to the target data storage environment;
   performing, by the virtual machine agent deployed on the source data storage environment, a backup of the data from the source data storage environment to the target data storage environment in accordance with the backup configuration; and
   outputting, to the user of the data management platform, an indication of an identifier associated with the target data storage environment.

2. The method of claim 1, further comprising:
   determining the failover event at the source data storage environment; and
   restoring the data at a storage location associated with the target data storage environment in accordance with the backup configuration and based at least in part on determining the failover event at the source data storage environment.

3. The method of claim 2, further comprising:
   displaying an identifier associated with the storage location upon completion of restoration of the data at the storage location.

4. The method of claim 2, further comprising:
   receiving, from the user of the data management platform, a selection of a snapshot to use when performing the backup of the data from the source data storage environment to the target data storage environment.

5. The method of claim 2, further comprising:
   identifying, in accordance with the backup configuration, at least one of the schedule for backing up the data from the source data storage environment to the target data storage environment, a time for capturing a snapshot, metadata associated with configuration files, memory information, network information, or a combination thereof, wherein restoring the data at the storage location is based at least in part on the identifying.

6. The method of claim 1, further comprising:
   determining that the user of the data management platform has completed a service level agreement, wherein performing the backup of the data from the source data storage environment to the target data storage environment is based at least in part on the determining.

7. The method of claim 1, further comprising:
   determining that the source data storage environment has been restored after the failover event; and
   discontinuing restoring of the data at the target data storage environment based at least in part on the determining.

8. The method of claim 1, wherein the data management platform configures the second set of computing resources included in the target data storage environment.

9. The method of claim 8, wherein the data management platform manages the second set of computing resources included in the target data storage environment according to a software as a service configuration for the user of the data management platform.

10. The method of claim 1, wherein the software code deployed on the source data storage environment to archive one or more snapshots of the source data storage environment in the target data storage environment.

11. An apparatus for data management, comprising:
    a processor;
    memory coupled with the processor; and
    instructions stored in the memory and executable by the processor to cause the apparatus to:
       receive, at a data management platform, a request to perform a backup service using storage resources associated with the data management platform;
       deploy, in response to receiving the request, a virtual machine agent on a source data storage environment comprising a first set of computing resources managed by a user of the data management platform, wherein the virtual machine agent facilitates the backup service between the source data storage environment and a target data storage environment based at least in part on the virtual machine agent comprising software code operable to execute the backup service, the source data storage environment comprising the first set of computing resources managed by the user and the target data storage environment comprising a second set of computing resources managed by the data management platform, and wherein the virtual machine agent configures the target data storage environment to automatically recover and restore data at the target data storage environment based at least in part on determining a failover event at the source data storage environment;

receive, from the user of the data management platform, a backup configuration configuring a schedule for backing up the data from the source data storage environment to the target data storage environment;

perform, by the virtual machine agent deployed on the source data storage environment, a backup of the data from the source data storage environment to the target data storage environment in accordance with the backup configuration; and output, to the user of the data management platform, an indication of an identifier associated with the target data storage environment.

12. The apparatus of claim 11, wherein the instructions are further executable by the processor to cause the apparatus to:
determine the failover event at the source data storage environment; and
restore the data at a storage location associated with the target data storage environment in accordance with the backup configuration and based at least in part on determining the failover event at the source data storage environment.

13. The apparatus of claim 12, wherein the instructions are further executable by the processor to cause the apparatus to:
display an identifier associated with the storage location upon completion of restoration of the data at the storage location.

14. The apparatus of claim 12, wherein the instructions are further executable by the processor to cause the apparatus to:
receive, from the user of the data management platform, a selection of a snapshot to use when performing the backup of the data from the source data storage environment to the target data storage environment.

15. The apparatus of claim 12, wherein the instructions are further executable by the processor to cause the apparatus to:
identify, in accordance with the backup configuration, at least one of the schedule for backing up the data from the source data storage environment to the target data storage environment, a time for capturing a snapshot, metadata associated with configuration files, memory information, network information, or a combination thereof, wherein restoring the data at the storage location is based at least in part on the identifying.

16. The apparatus of claim 11, wherein the instructions are further executable by the processor to cause the apparatus to:
determine that the user of the data management platform has completed a service level agreement, wherein performing the backup of the data from the source data storage environment to the target data storage environment is based at least in part on the determining.

17. The apparatus of claim 11, wherein the instructions are further executable by the processor to cause the apparatus to:
determine that the source data storage environment has been restored after the failover event; and
discontinue restoring of the data at the target data storage environment based at least in part on the determining.

18. The apparatus of claim 11, wherein the data management platform configures the second set of computing resources included in the target data storage environment.

19. The apparatus of claim 18, wherein the data management platform manages the second set of computing resources included in the target data storage environment according to a software as a service configuration for the user of the data management platform.

20. A non-transitory computer-readable medium storing code for data management, the code comprising instructions executable by a processor to:
receive, at a data management platform, a request to perform a backup service using storage resources associated with the data management platform;
deploy, in response to receiving the request, a virtual machine agent on a source data storage environment comprising a first set of computing resources managed by a user of the data management platform, wherein the virtual machine agent facilitates the backup service between the source data storage environment and a target data storage environment based at least in part on the virtual machine agent comprising software code operable to execute the backup service, the source data storage environment comprising the first set of computing resources managed by the user and the target data storage environment comprising a second set of computing resources managed by the data management platform, and wherein the virtual machine agent configures the target data storage environment to automatically recover and restore data at the target data storage environment based at least in part on determining a failover event at the source data storage environment;
receive, from the user of the data management platform, a backup configuration configuring a schedule for backing up the data from the source data storage environment to the target data storage environment;
perform, by the virtual machine agent deployed on the source data storage environment, a backup of the data from the source data storage environment to the target data storage environment in accordance with the backup configuration; and
output, to the user of the data management platform, an indication of an identifier associated with the target data storage environment.

* * * * *